United States Patent [19]
Landy, III

[11] Patent Number: 6,132,101
[45] Date of Patent: Oct. 17, 2000

[54] ROLL BEARING ASSEMBLY HAVING INTEGRAL COMPONENTS

[75] Inventor: Mark Landy, III, Verona, Pa.

[73] Assignee: Voest Alpine Industries, Inc., Canonsburg, Pa.

[21] Appl. No.: 09/362,822

[22] Filed: Jul. 28, 1999

[51] Int. Cl.[7] .................................................. F16C 19/38
[52] U.S. Cl. ........................................... 384/559; 384/571
[58] Field of Search ................................... 384/559, 571, 384/584, 563, 583

[56] References Cited

U.S. PATENT DOCUMENTS

| | | |
|---|---|---|
| 3,080,199 | 3/1963 | Rickley . |
| 3,413,022 | 11/1968 | Waddell ............................... 287/52.07 |
| 3,535,008 | 10/1970 | Buta . |
| 3,966,282 | 6/1976 | Overton . |
| 4,136,989 | 1/1979 | Bianco ..................................... 403/261 |
| 5,154,518 | 10/1992 | Goforth, Jr. ............................. 384/584 |
| 5,411,337 | 5/1995 | Bianco et al. .......................... 384/519 |

*Primary Examiner*—Lenard A. Footland
*Attorney, Agent, or Firm*—Armstrong, Westerman, Hattori, McLeland & Naughton

[57] ABSTRACT

Apparatus for use on hot and cold rolling mills for retaining a roller bearing assembly and chock as an integral unit during removal or replacement of a roll. A clamping means of the assembly can be disposed to either engage an annular groove in a necked portion of the roll as during operation of the mill or not engage the groove as during removal or replacement of the roll. The clamping means remains slideably connected to the assembly as the clamping means is disposed for axial movement of the chock and bearing assembly during removal or replacement.

14 Claims, 3 Drawing Sheets

ROLL BEARING ASSEMBLY HAVING INTEGRAL COMPONENTS

BACKGROUND OF THE INVENTION

1. Field of the Invention

This invention relates to hot and cold rolling mills for thickness gauge reduction of metal strip and to roll bearing assemblies associated with work roll and back-up roll chocks of those mills.

2. Description of Related Art

In thickness gauge reduction of metal strip on both hot and cold rolling mills, back-up rolls and work rolls of the mills require roll replacement because of roll wear or damage. Replacement is typically carried out by removing the roll along with its chocks and bearing retaining assemblies as a single unit. Following such removal, the chocks and bearing retainer assemblies at each longitudinal end of the roll are removed prior to roll dressing and/or repairing. Such chocks and bearing retainer assemblies are heavy and often are lifted with use of a crane or other mechanical lifting devise. Components of the assemblies can cause injury to mill personnel if such components are accidentally dropped during disassembly.

It is an object of this invention to provide a bearing assembly for the roll wherein, all components are integrally connected, both during rolling operations and during removal from the roll, so as to eliminate possible injury to mill personnel.

Bearing retainer assemblies, utilizing a split ring type component, as in the present invention, are described in the following related art documents:

U.S. Pat. No. 3,080,199 describes a split-ring type assembly having two generally semi-circular halves attached to a key for insertion along a keyway in the roll. The split-ring/key component is removed as a separate unit during roll replacement.

U.S. Pat. No. 3,966,282 describes a split-ring type assembly wherein two identical semi-annular segments having cam surfaces on their backsides are required to be removed from the assembly when being removed from the roll.

U.S. Pat. No. 4,136,989 describes a split ring having two segments forming a ring. The segments are hinged at one end and joined at the opposite ends by an eye bolt inserted through end portions lugs. The ring is completely removed from the assembly during a roll change.

U.S. Pat. No. 5,154,518 shows a split ring which resides in an annular grove of the roll neck and engages an outer ring having wedge shaped projections for imparting axial movement to the assembly. Such rings are not integral with the other components.

U.S. Pat. No. 5,411,337 shows a split ring having two arcuate members pivotally linked to each other by an intermediate link member. The ring is disposed inside a locking ring assembly and is not integral when removed from the roll.

None of the above described bearing retainer assemblies, utilizing a split-ring component, provides a means for making the split-ring clamp integral with the assembly and bearing chock when removed from the necked portion of the roll.

SUMMARY OF THE INVENTION

This invention provides a roll bearing locking assembly for use in combination with a chock and roll of a rolling mill. Such assembly is useful on both work rolls and back-up rolls of a rolling mill. The assembly comprises an inner race retainer for the roll bearing inner race circumscribing a necked end portion of the roll and bearing laterally on the bearing inner race which along with an outer race and interposed bearings rotatably support the roll. A split-ring clamp circumscribes an annular grooved portion of the necked end of the roll and a nut is threadably attached to the bearing inner race retainer to laterally transfer force from the retainer to the split-ring clamp. The split-ring clamp has two arcuately shaped portions hingedly connected to an intermediate plate which provides means for making the clamp integral with the assembly and chock. When in a "closed" position, the arcuately shaped portions laterally contact a shoulder of the annular groove portion and prevent movement of the assembly in the axial direction of the roll. When in an "opened" position the arcuately shaped portions clear such shoulder and enable removal of the assembly and chock from the necked end of the roll.

Other specific features and contributions of the invention are described in more detail with reference being made to the accompanying drawings.

DETAILED DESCRIPTION OF THE INVENTION

Figure 1:
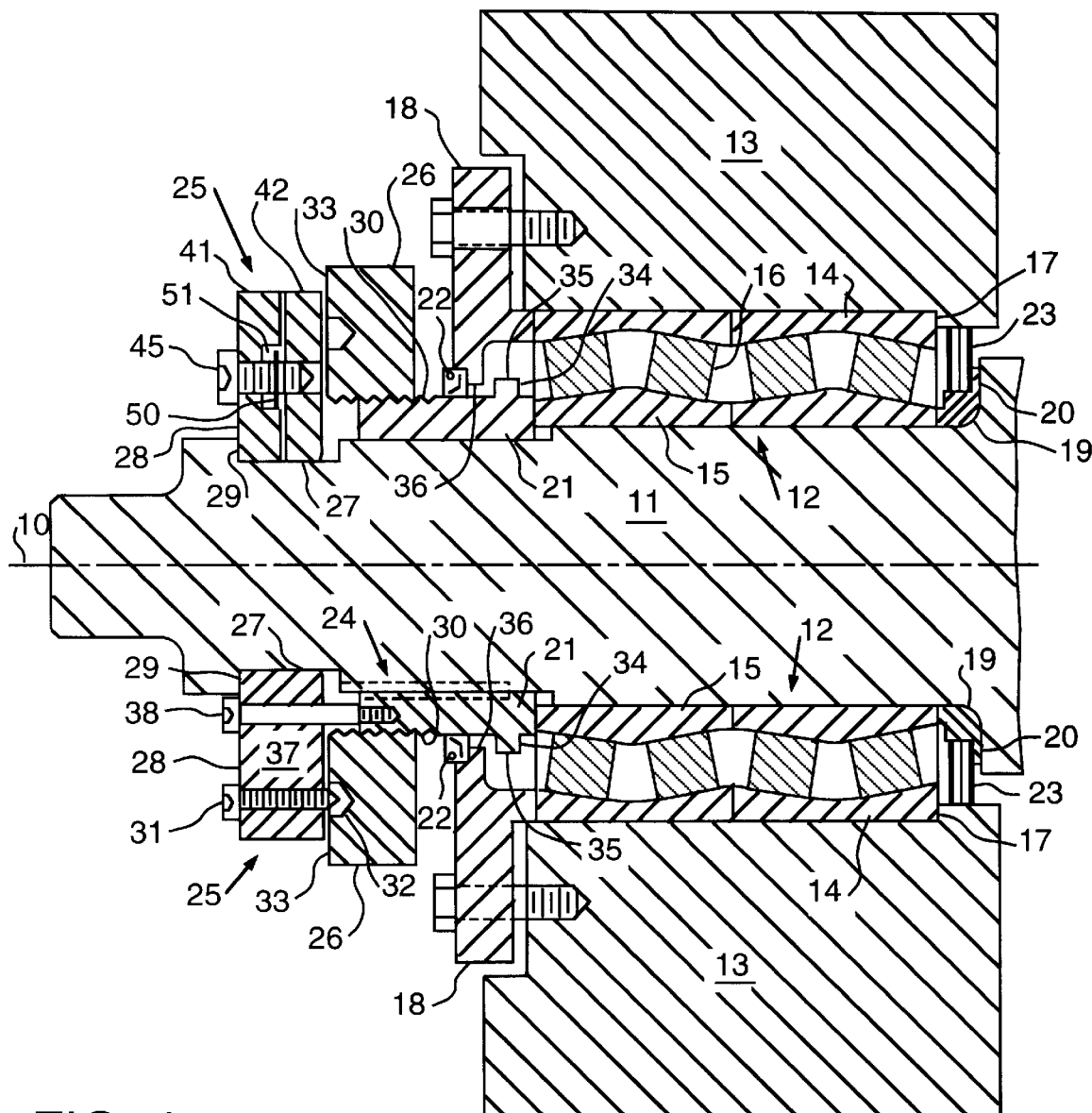
FIG. 1 is a cross sectional view of a rolling mill roll taken in a vertical plane through the central axis of the roll for describing a roll chock and its relationship to a bearing assembly of the invention.

Apparatus of this invention is applicable to both work rolls and back-up rolls of a rolling mill. FIG. 1 shows a cross sectional view taken in a vertical plane through central axis 10 of roll 11. The roll is rotatably supported by bearing unit 12 housed within rolling mill chock 13. Such chock is slideably retained between housing posts of a mill stand (not shown).

Bearing unit 12 is comprised of a bearing outer race (cup) 14, a bearing inner race (cone) 15 and bearing rollers 16. Other roll bearing unit configurations are possible and the apparatus of the invention is applicable to most types of roller bearing units.

Figure 2:
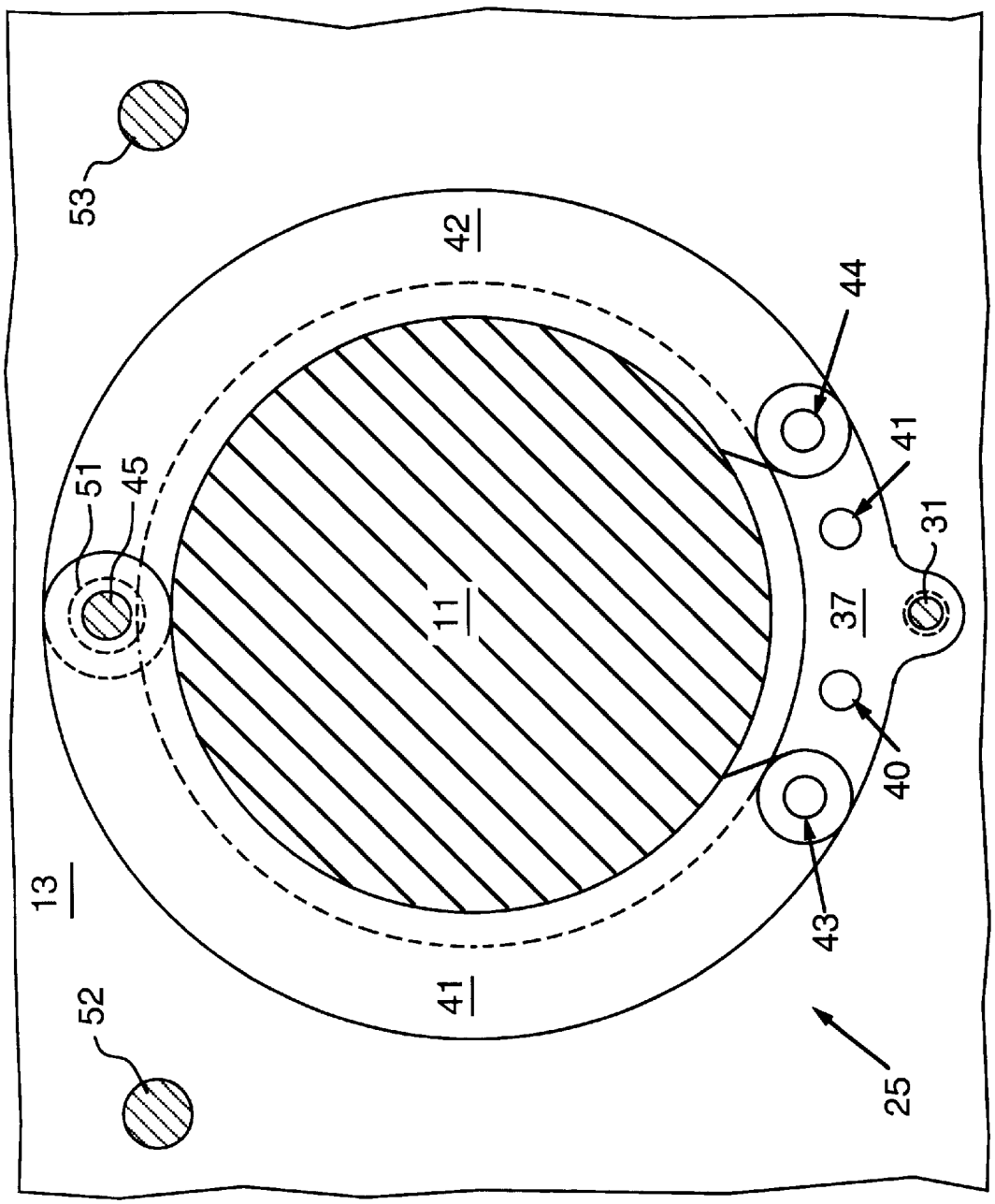
FIG. 2 is an end view of the roll of FIG. 1 showing a split-ring clamp of the invention in a closed position.
Figure 3:
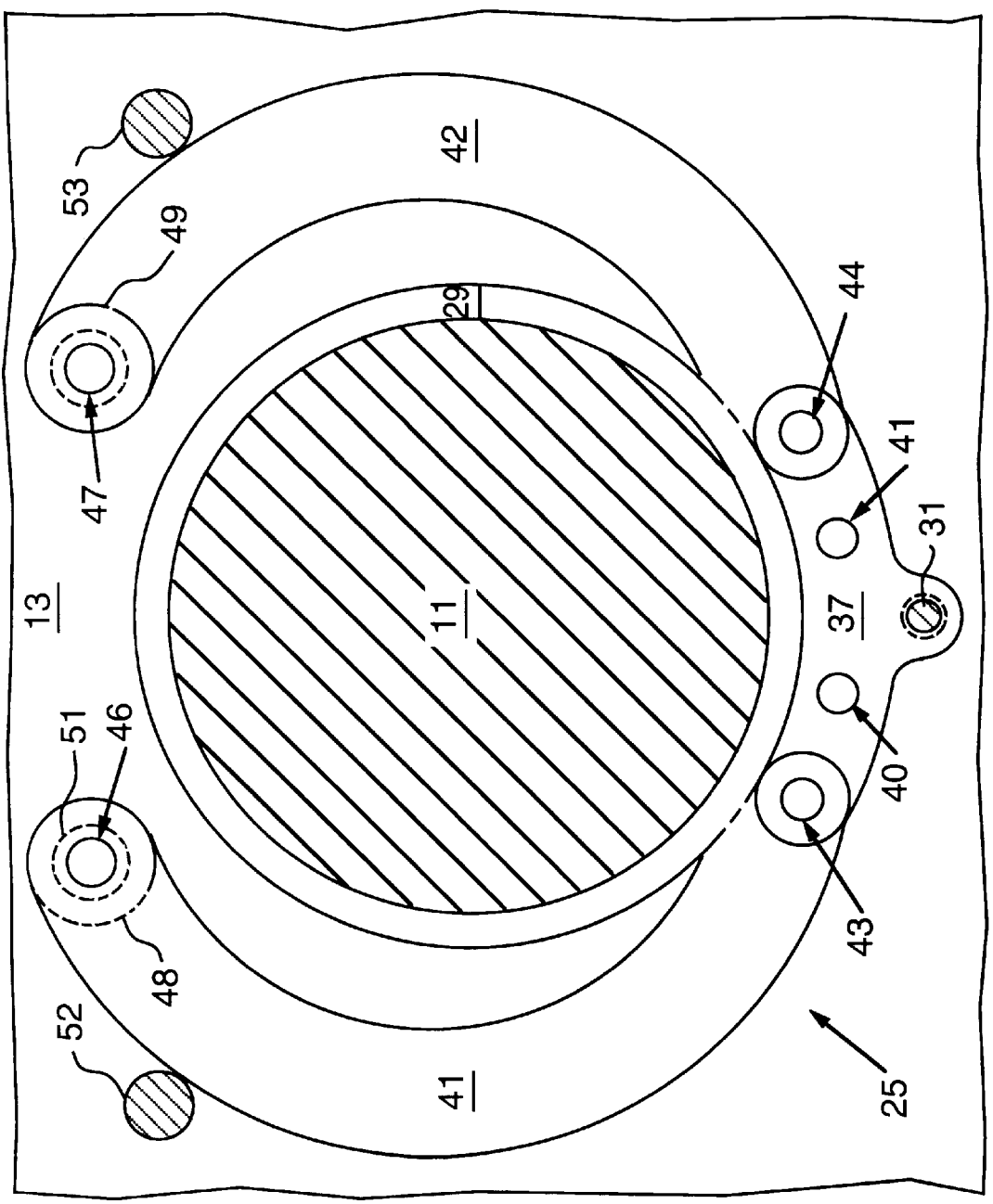
FIG. 3 is an end view of the roll of FIG. 1 with the split-ring clamp of the invention in an open position for removal of the assembly, as an integral unit, from a necked end of the roll.

Bearing outer race 14 of the bearing unit is held in position laterally by shoulder 17 on the chock, and bearing outer race retainer ring 18 which is bolted to chock 13 at a plurality of locations around the ring. Such chock shoulder and bearing outer race retainer ring bear laterally on opposite vertical faces of the bearing outer race to retain the bearing outer race within the chock. In a similar manner bearing inner race 15 is held laterally in position on roll 11 between seal means 19 which is against shoulder 20 of the roll, and bearing inner race retainer 21. Such roll shoulder and bearing inner race retainer bear laterally on opposite vertical faces of the bearing inner race. A plurality of rollers 16 rotate between such inner and outer races to provide low friction rotational support to the roll. A bearing seal 22 can be incorporated into the bearing inner race retainer to prevent debris from contaminating the bearing and to contain a bearing lubricant in proximity to the bearing. Seal means 19 and 23 complete the seal on the opposite end of the bearing. Bearing inner race retainer 21 circumscribes a necked portion of roll 11 and is keyed to the roll at 24 to prevent relative rotation between the bearing inner race retainer and the roll; the bearing inner race retainer is free to slide axially on the roll however. Lateral positioning and force for holding bearing inner race 15 against roll shoulder 20 is provided by the combination of split-ring clamp 25 and threaded nut 26. Split-ring clamp 25 is shown in FIGS. 2 and 3 in relation to end views of roll 11. Split-ring clamp 25, as disposed during rolling mill operation, closely circumscribes annular groove portion 27 of the roll neck in a manner such that a vertically oriented face 28 of the split-ring clamp bears laterally on shoulder 29 of annular groove 27. Threaded nut 26 provides a connecting member between bearing inner race retainer 21 and split-ring clamp 25 in order that bearing inner race retainer 21 can exert lateral force on bearing inner race 15 to hold it in place against roll shoulder 20. Bearing inner race retainer 21 applies force on the bearing inner race by advancement of threaded inner surface of threaded nut 26 on threaded outer surface 30 of retainer 21. Such advancement by rotation of threaded nut 26 in the proper direction on retainer 21, can be carried out with use of a spanner wrench (not shown). Following rotation of the threaded nut, so as to provide adequate lateral force between bearing inner race 15 and bearing inner race retainer 21, the nut is prevented from unwanted rotation by lock pin 31 which can be advanced into cavity 32 in threaded nut 26. A plurality of such cavities are disposed around face 33 of the nut so as to allow alignment of the pin and one of said cavities at closely spaced intervals.

Chock 16, roll bearing 20 bearing inner race retainer 21, split-ring clamp 25, and threaded nut 26, are duplicated at the opposite end of roll 11. Positioning of the roll in a lateral direction, in relation to the mill stand and its housing posts, can be accomplished to a limited extent by coordinated adjustment of threaded nuts 26 at each end of the roll.

As mentioned above, it is necessary to periodically remove rolls of a rolling mill for dressing, repair and various other reasons. Such removal can be as often as every few hours in some rolling operations. Roll removal is, in most cases, accomplished by removing the entire roll assembly comprising the roll, chocks, bearings and bearing retainer assemblies as one unit, then removing the chocks, bearings and bearing retainer assemblies from the roll remote from the rolling mill operation. The rolling mill operation can be continued in a productive manner by immediate replacement of the rolls with previously dressed or repaired roll assemblies.

It is an object of the invention to be able to remove the chocks, bearings and bearing retainer assemblies from the roll as one integrated unit. In prior practice, wherein roll bearing assemblies utilize a split-ring clamp, such clamps are removed from the roll and from the assembly as a separate unit. Because of its weight it is difficult to handle and can cause injury to mill personnel if accidently dropped.

The split-ring clamp of the present invention remains integral with the roll bearing assembly and additionally, the assembly remains integral with the chock. Protruding ridge 34 on bearing inner race retainer 21 keeps the roll bearing assembly, consisting of bearings 20 retainer 21, split-ring clamp 25, and threaded nut 26, integral with the chock. An outer diameter of such ridge at 35 is greater than an inner diameter of the bearing inner race retainer at 36 thereby preventing separation of the roll bearing assembly and the chock.

Referring to FIGS. 1–3, split-ring clamp 25 is made integral with the bearing assembly by attachment of pivot plate 37 to bearing inner race retainer 21. In the preferred embodiment two shoulder bolts, such as 38 (FIG. 1), pass through apertures 39, 40 (FIGS. 2–3) and threadably attach to bearing inner race retainer 21 so as to slideably attach pivot plate 37 to retainer 21. Arcuate wings 41 and 42 pivot from the pivot plate on shaft-like means 43 and 44 which can consist of bolts secured with nuts.

FIG. 2 depicts the split-ring clamp in its closed position and FIG. 3 depicts it in its open position. When closed, distal ends of the wings (opposite the pivoting ends) overlap and are rigidly connected to each other by locking bolt 45, (best seen in FIG. 1) which passes through aperture 46 of arcuate wing 41 and is threadably attached to internally threadable aperture 47 of arcuate wing 42. Such wings, in the areas of overlap, are reduced in thickness so as to overlap without interference. Such areas of reduced thickness are indicated by semi-circular lines 48 and 49 in FIG. 3. In a preferred embodiment, locking bolt 45 is integrally retained with the split-ring assembly with use of snap ring 50 in combination with a stepped increased diameter portion 51 of aperture 46.

When in the open position, for removal from or installation on a roll, arcuate wings 41 and 42 are prevented from opening to an extent whereby they are more subject to damage, by elongated stop pins 52 and 53 (FIGS. 2 and 3) which protrude away from a face of chock 13 in the direction of the roll axis. Placement of the pins is such that opening of the arcuate wings is limited to that required for clearance of the wings past shoulder 29 of annular groove 27. Shoulder 29 is indicated in FIG. 3 and such clearance is depicted.

Removal of the bearing assembly from the roll is accomplished by disengaging solely fastener 45; shoulder bolts 38 are not loosened or removed and all components of the assembly remain integral with the roll chock.

While specific details of construction have been set forth for purposes of describing an embodiment of the invention, various modifications can be resorted to, in light of the above teachings, without departing from the applicant's novel contributions; therefore in determining the scope of the present invention reference shall be made to the appended claims.

What is claimed is:

1. On a rolling mill having a support stand, roll chocks mounted on the stand, a roll supported at each end in the roll chocks, each end of the roll having a necked portion with a groove formed in each end, an improved bearing assembly at each end of the roll comprising:

a. a bearing inner race around the necked portion of the roll, b. means restraining the inner race from axial movement, c. a bearing outer race fixed to the chock, d. rollers interposed between the inner and outer races, e. means connecting a–d to the chock to permit the chock and bearing assembly to be slidable as an integral unit on and off the necked end of the roll, and f. clamp means engaged in the roll groove and connected to the bearing assembly to restrain the bearing assembly from axial movement during operation of the mill and to permit axial movement on and off the necked end of the roll as an integral unit during removal or replacement of the roll.

2. A bearing assembly according to claim 1, wherein the means for restraining the inner race from axial movement comprises:

a bearing inner race retaining ring circumscribing the necked portion of the roll and in lateral contact with the inner race, and a threaded nut, threadably connected to the retaining ring and in lateral contact with the clamp means.

3. A bearing assembly according to claim 1, wherein the clamp means is slideably connected to the inner race retaining means so as to maintain the bearing assembly as an integral unit and enable adjustment of the axial restraint on the bearing inner race.

4. A bearing assembly according to claim 3, wherein the clamp means comprises a pivot plate slideably connected to the inner race restraining means, a pair of arcuate wings, each pivotally connected at one of its ends to the pivot plate so as to enable pivoting to positions to either restrain or permit axial movement of the bearing assembly, and means for rigidly connecting together distal ends, opposite the pivoting ends, of the arcuate wings when in the restraining position.

5. A bearing assembly according to claim 4, further comprising means for limiting pivoting of the arcuate wings during positioning to permit axial movement of the chock and bearing assembly on the roll as carried out during removal or replacement of the roll.

6. A bearing assembly according to claim 5, wherein the means for limiting pivoting comprises a pair of elongated members, one associated with each wing, protruding from the chock so as to interfere with the arcuate wings and prevent additional pivoting when the wings are at least positioned so as to permit axial movement of the bearing assembly on the roll.

7. A bearing assembly according to claim 1, further comprising means for preventing rotation of the inner race restraining means relative to the roll.

8. On a rolling mill having a support stand, roll chocks mounted on the stand, a roll supported at each end in the roll chocks, each end of the roll having a necked portion with a groove formed in each end, an improved bearing assembly at each end of the roll comprising a. a bearing inner race circumscribing the necked portion of the roll, b. a bearing inner race retaining ring circumscribing the necked portion of the roll and in lateral contact with the inner race, c. a bearing outer race fixed to the chock, d. rollers interposed between the inner and outer races, e. a pivot plate slideably connected to the retaining ring f. a pair of arcuate wings for engaging the roll groove, each pivotally connected at one of its ends to the pivot plate so as to enable pivotal positioning of the wings so as to restrain or permit axial movement of the bearing assembly and chock on the roll, g. means for rigidly connecting together distal ends of the arcuate wings opposite the pivoting ends of the arcuate wings, h. a threaded nut, threadably connected to the retaining ring and in lateral contact with the arcuate wings, and i. means connecting a–h to the chock to permit the chock and bearing assembly to be axially slidable as an integral unit on and off the necked end of the roll during removal or replacement of the roll.

9. A bearing assembly according to claim 8, further including means for preventing rotation of the inner race retaining ring relative to the roll.

10. A bearing assembly according to claim 9, wherein said means for preventing relative rotation comprises:

a keyway in the necked end portion of the roll, a keyway on the inner race retaining ring, and a key for insertion in the keyways when aligned.

11. A bearing assembly according to claim 8, further comprising a means for preventing rotation of the threaded nut on the retaining ring during operation of the mill.

12. A bearing assembly according to claim 11, wherein the means for preventing rotation comprises a plurality of cavities disposed around the threaded nut, and means protruding from the pivot plate into one of the plurality of cavities.

13. A bearing assembly according to claim 8, wherein the means for connecting together the distal ends of the arcuate wings comprises an aperture in the distal end of one of the wings, a threaded aperture in the distal end of the remaining wing, and a bolt having a head and a threaded stem with said stem projecting through the aperture and threaded into the threaded aperture.

14. A bearing assembly according to claim 8, wherein the means for connecting together the distal ends of the arcuate wings comprises a stepped aperture in the distal end of one wing, a threaded aperture in the distal end of the remaining wing, a bolt having a head, a threaded stem and a reduced diameter portion along a portion of the threaded stem, said stem projecting through the aperture and threaded into the threaded aperture, and a snap ring circumscribing the reduced diameter portion of the stem to limit axial movement of the bolt in the stepped aperture and retain the bolt in the stepped aperture so as to enable disconnecting ends of the arcuate wings and retain the bolt as part of the integral unit of the chock and bearing assembly.

* * * * *